United States Patent Office 2,729,974
Patented Jan. 10, 1956

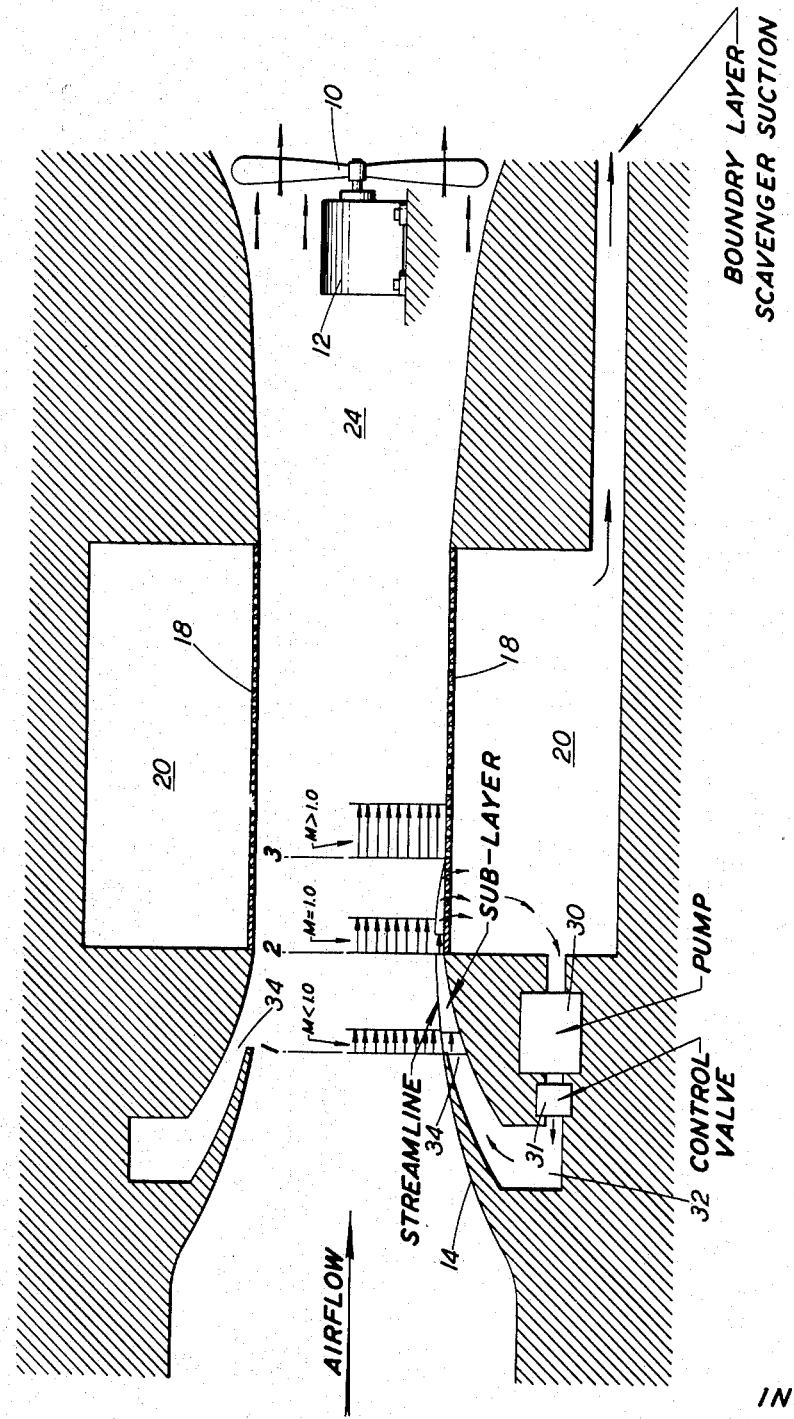

2,729,974

TRANSONIC FLOW CONTROL WITH REDUCED POWER

John G. Lee, Farmington, and Henry H. Hoadley, Manchester, Conn., assignors to United Aircraft Corporation, East Hartford, Conn., a corporation of Delaware Application February 15, 1952, Serial No. 271,772

3 Claims. (Cl. 73—147)

This invention relates to devices for the control of confined fluid streams and more particularly to devices for controlling confined fluids at transonic velocities.

In order to determine the characteristics of fluid flow at transonic velocities substantial test equipment has been required in order to obtain and maintain the desired flow characteristics. It has been the practice in wind tunnels and the like to utilize De Laval type nozzles whose walls could be varied in shape so as to produce the desired transonic Mach number in the test section. In large wind tunnels and similar test facilities considerable equipment is necessary in order to manipulate the walls of these nozzles to obtain the desired flow characteristics.

One method for obtaining transonic flow without recourse to a De Laval type supersonic nozzle is to utilize fixed porous or perforated walls for confining the stream and then by suction removing a portion of the fluid stream through these perforations so as to generate the desired low supersonic Mach numbers. By withdrawing the fluid in this manner the main stream in effect is allowed to expand such that its velocity can be increased to speeds above sonic. However, for generating increased Mach numbers the power requirements for such a system become excessive and often beyond the capacity of equipment which can be economically installed. For example, it has been found that approximately 6% of the weight flow of the stream at Mach number 1 must be removed through such perforations in order to generate a Mach number of approximately 1.3 in the test section. In order to generate a Mach number of approximately 1.6 as much as 20% of the weight flow of the stream must be removed. Hence, utilizing suction to generate transonic flow not only requires removal of large weight flows but also involves a very large amount of power for moving the main stream since all of the dynamic head, i. e., kinetic energy of the main stream, is dissipated upon withdrawal through the perforated confining wall.

It is therefore an object of this invention to provide a device for economically controlling confined fluid streams, as for example in a wind tunnel over a range of transonic velocities.

It is a further object of this invention to provide a device of the type described which comprises a duct having a perforated wall portion and suction means for removing the boundary flow through the perforated wall while also providing recirculating means for injecting a portion of the removed fluid back into the duct to reduce the power requirements normally needed for maintaining transonic flow.

These and other objects will become readily apparent from the following detail description of the drawing which illustrates a cross section of a wind tunnel or the like and includes diagrammatic illustrations of the velocity profile at various stations along the axis of flow.

Referring to the drawing, an accelerating device such as a fan 10 is illustrated as being driven by a motor 12 which can be operated by a suitable source of power.

The fan 10 sucks the air in the direction of the arrows through a subsonic tapering nozzle 14 which accelerates the air such that it reaches Mach number 1 substantially at the station indicated by position 2 on the drawing.

The test section is defined by a perforated wall 18 and is of constant cross section. A plenum chamber 20 surrounds the wall 18 and is subjected to a pressure substantially that corresponding to the static pressure of the desired Mach number. This results in air flowing through the walls 18 to the plenum chamber 20 which thereby satisfies the requirements of the airflow in accelerating from a Mach number of 1 to the desired supersonic Mach number. At station 3 no pressure difference exists across the wall and thus the Mach number remains constant for the rest of the constant area section.

In order to reduce the power necessary to maintain the desired transonic velocity a pump 30 is provided which communicates with the chamber 20. The pump 30 forces a portion of the fluid from the chamber 20 via the control valve 31 and the passage 32 out through an annular opening 34 which is located upstream of the perforated wall portion 18. The valve 31 provides control for the quantity and pressure of the fluid being moved through passage 32. The air being ejected via the annular opening 34 moves downstream as a layer which can be defined in thickness by the stream line, as indicated on the drawing. This layer, which is indicated as the sub-layer in the drawing, is subsequently removed via the perforations in the wall 18. The sub-layer is of a lower energy than the main stream and of lesser weight flow so that the amount removed through the wall 18 is greatly reduced while still obtaining the desired Mach number.

The savings in power obtained by the structure described can best be illustrated by first considering the flow which lies between the dividing stream line and the confining fixed surface, namely the sub-layer. By analogy we can, for example, assume that this sub-layer is that flow of fluid which must be withdrawn through the porous wall 18 in order to generate the desired supersonic Mach number. The weight flow that must be removed may be shown to be dependent upon the local Mach number, temperature, and total head if we assume that the static pressure remains constant across the flow. The local total head or center stream Mach number together with temperature will determine the weight flow. Therefore, considerable reduction of the weight flow removed can be realized by reducing the total head. For example then, if the total temperature remains unchanged and if, for example, the Mach number of the sub-layer is 0.5 when the center stream Mach number is unity, it can be shown that the total head of the sub-layer would need be 62% of the center stream total head which would reduce the weight flow of the fluid in the sub-layer by 53% below that which would occur in the event that the total head of the fluid adjacent the wall were equal to that of the center stream. Next, if one considers that this air is recirculated at low total head, then a further reduction of secondary power can be realized above that due to the reduction of weight flow since by recirculating the required pressure ratio of the compressor or pump 30 would be about 60% of that which would be necessary in the event that the recirculated air would have to be compressed back to equal the total head of the center stream.

In operation then the required amount of recirculating air is withdrawn from the plenum chamber 20 which surrounds the test section and is ejected into or joined with the main airstream at a point upstream of station 2, i. e., at station 1. It will be noted that at station 2 the main stream has obtained a Mach number of 1. At station 3 the center stream can be considered as having expanded to the desired supersonic Mach number, i. e., above 1 so that the sub-layer which is of subsonic velocity is withdrawn thereby presenting a uniform flow through the remainder of the test section. The final result is such that although the confining surfaces of the tunnel are fixed a virtual variable contour supersonic nozzle is produced whereby the main stream is converged and subsequently diverged.

Suction is also provided in order to remove any boundary layer which might build up along the downstream portion of the wall 18 so as to maintain the desired supersonic Mach number.

As a result of this invention it is apparent that an economic means has been provided for generating transonic Mach numbers for wind tunnels and the like without recourse to mechanically moved walls.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In a fluid flow control device, the combination of a fluid confining passage having a converging portion and a portion of substantially constant cross section, said portion of constant cross section having perforations therein which extend around the periphery thereof, means for moving a mass of fluid through said passage so that its velocity is increased to at least sonic speed at the point of maximum convergence of said converging portion, means operatively connected to the outside of said portion of constant cross section for withdrawing fluid from the passage through said perforations to remove low energy fluid immediately adjacent thereto, and pump means for moving a portion of the withdrawn fluid back into the main stream including an annular opening adjacent the juncture of said portions, said annular opening being coaxially disposed relative to said passage and the moving mass of fluid.

2. In a mechanism for delaying the choking in a confined airstream, the combination of, a duct including a wall portion having perforations extending along the axis thereof and also extending around the periphery thereof, means for moving a main mass of air through said duct, including mechanism for producing at least sonic velocity to the air when it reaches said perforated portion, means for withdrawing a portion of the air from the main stream along the wall of the duct through the perforations of said portion, and pump means for injecting a portion of the withdrawn air into the main stream comprising a passage communicating with said withdrawing means and an annular opening in said duct located immediately upstream of said perforated portion and operatively connected to said passage, said annular opening being coaxially disposed with respect to said perforated portion.

3. In a fluid duct having a fixed wall portion of substantially constant cross section and having a fluid stream flowing therethrough, a wall portion converging in a downstream direction and located immediately upstream of said duct and coaxially disposed in relation thereto, means for injecting an annular layer of fluid coaxially with and around the main stream and immediately at the downstream end of said converging wall portion, said layer having a lower total pressure than the main stream and forming an effective layer which is a continuation of said converging wall portion, means for substantially withdrawing said layer of fluid in said wall portion of constant cross section to form a layer of fluid in said portion which diverges in a downstream direction to expand the main stream at that position including openings in said duct which openings extend around the periphery of said duct, and means providing communication with the outside of said wall portion of constant cross section and said injecting means.

References Cited in the file of this patent

FOREIGN PATENTS

| | | |
|---|---|---|
| 792,293 | France | Dec. 26, 1935 |
| 579,758 | Great Britain | Aug. 14, 1946 |
| 438,578 | Italy | Aug. 17, 1948 |
| 619,250 | Great Britain | Mar. 7, 1949 |